United States Patent [19]
Wakabayashi et al.

[11] Patent Number: 5,373,515
[45] Date of Patent: Dec. 13, 1994

[54] LASER WAVELENGTH CONTROLLING APPARATUS

[75] Inventors: Osamu Wakabayashi; Yasuo Itakura; Masahiko Kowaka; Yoshino Amada, all of Kanagawa, Japan

[73] Assignee: Kabushiki Kaisha Komatsu Seisakusho, Tokyo, Japan

[21] Appl. No.: 721,929

[22] Filed: Jun. 21, 1991

Related U.S. Application Data

[63] Continuation of Ser. No. 455,327, Jan. 16, 1990, abandoned.

[30] Foreign Application Priority Data

Jul. 17, 1987 [JP] Japan ................................. 62-177320
Aug. 28, 1987 [JP] Japan ................................. 62-214396

[51] Int. Cl.$^5$ ............................................. H01S 3/13
[52] U.S. Cl. ...................................... 372/20; 356/352; 356/346
[58] Field of Search ................. 372/32, 29; 356/352, 356/346

[56] References Cited

U.S. PATENT DOCUMENTS

| | | |
|---|---|---|
| 3,471,803 | 10/1969 | Forster . |
| 3,534,288 | 10/1970 | Forster . |
| 4,272,734 | 6/1981 | Jarrett et al. . |
| 4,905,243 | 3/1990 | Lokai et al. ............ 372/32 |
| 4,975,919 | 12/1990 | Amada et al. ............ 372/32 |
| 5,198,872 | 3/1993 | Wakabayashi et al. ............. 356/346 |

FOREIGN PATENT DOCUMENTS

0093005 11/1983 European Pat. Off. .
2050684 1/1981 United Kingdom .

*Primary Examiner*—Léon Scott, Jr.
*Attorney, Agent, or Firm*—Armstrong, Westerman Hattori, McLeland & Naughton

[57] ABSTRACT

A laser wavelength controlling apparatus adapted for controlling the wavelength of a narrow-band oscillation laser beam at a high accuracy for long period of time even if environmental conditions such as the atmospheric temperature and pressure changes to some degree. This wavelength controlling apparatus includes a wavelength selective element (2) for narrowing the band width of the oscillating laser beam; a wavelength selection controller 9 and a wavelength selective element driver for changing the wavelength to be selected by the wavelength selective element (2); a reference light source (7) for generating a reference light for measuring the wavelength of the oscillating laser beam; a wavelength detector (8) for leading said oscillating laser beam and said reference light into a spectroscope and detecting the absolute wavelength of said oscillating laser beam on the basis of the detected value of the reference light; and a wavelength detecting driver (8a) for controlling the wavelength to be selected by said wavelength selective element in cooperation with said wavelength controller (9) so as to correspond the absolute wavelength detected by the wavelength detector with the preset wavelength.

8 Claims, 5 Drawing Sheets

LASER WAVELENGTH CONTROLLING APPARATUS

This application is a continuation of application Ser. No. 455,327 filed Jan. 16, 1990 and now abandoned.

TECHNICAL FIELD OF THE INVENTION

The present invention relates to a laser wavelength controlling apparatus for controlling the wavelength of a laser beam such as excimer laser or the like and, more particularly, to such an apparatus for controlling the wavelength of a narrow-band oscillation excimer laser with a high accuracy for a long period of time.

BACKGROUND ART OF THE INVENTION

The use of an excimer laser as a light source of a reduction projection aligner for exposing patterns of integrating circuits, etc on semi-conductor wafers is attracting public attention. To eliminate the need for correcting the chromatic aberration of reduction projection lenses, the band of a excimer laser beam (referred to hereinbelow simply as oscillated laser beam) is narrowed, and the thus obtained laser beam with a narrow band width is used as the light source for exposure.

Figure 1:
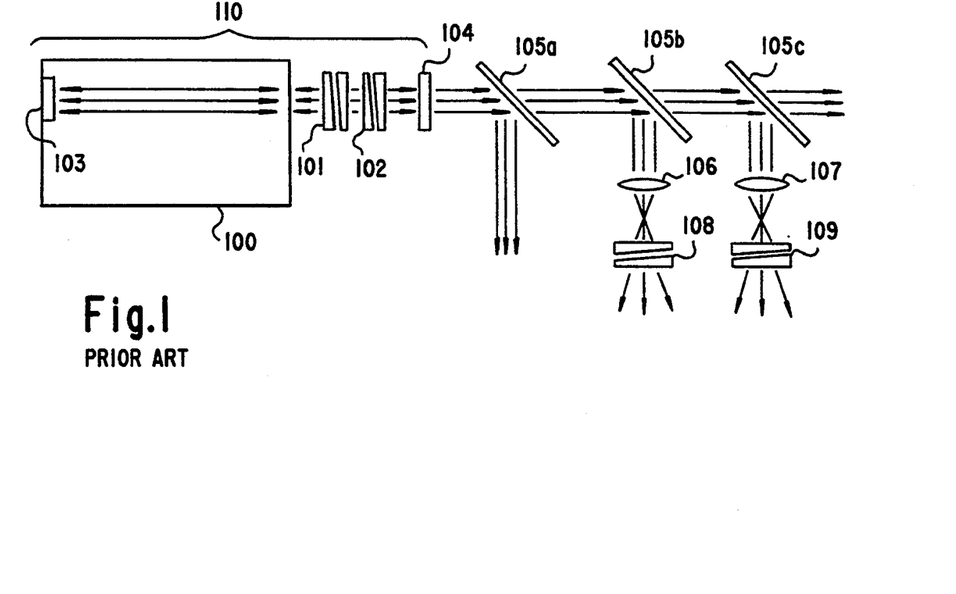
FIG. 1 is a block diagram showing the configuration of the prior art laser wavelength controlling apparatus.

The prior art apparatus for controlling oscillating laser with a narrow band width comprises, as shown in FIG. 1, a laser resonator 110 which includes two etalons 101 and 102 located between a laser chamber 100 and a front mirror 104. The arrangement is made such that the wavelength of the laser beam transparent to the respective etalons 101 and 102 can be adjusted by varying the angle of etalons 101, 102, respectively, and the laser beam is repeatedly reflected between a rear mirror 103 and the front mirror 104 thereby exciting it and then oscillating it from the front mirror. The oscillated laser beam is partially reflected by beam splitters 105a, 105b and 105c. In this arrangement, as the means for detecting the wavelength of the oscillated laser beam, a laser wavelength controlling apparatus is used, which is arranged to generate a narrow-band laser beam having a predetermined wavelength by leading the oscillating laser beams reflected by the beam splitters 105b and 105c, respectively, via lenses 106 and 107 into monitor etalons 108 and 109, respectively to thereby detect the wavelength thereof by these two pieces of etalons 108 and 109, respectively, and effecting feed-back control (not shown in the drawing) of the wavelength of the laser beams transparent to the etalons 108 and 109 on the basis of the detected value of wavelength.

However, in case monitor etalons or a diffraction grating type spectroscope are used as the wavelength detector, it was difficult to detect the absolute value of the wavelength of the laser beam, because of fluctuations in the wavelength to be measured due to changes in environmental conditions (such as, for example, the atmospheric temperature and pressure, etc.).

Consequently, in case the wavelength of the oscillating laser beam with a narrow band width was controlled by means of such a wavelength detector, it was impossible to control and stabilize the absolute value of the wavelength thereof with a high accuracy for a long period of time.

SUMMARY OF THE INVENTION

The present invention has been made in view of the above-mentioned circumstances, and has for its object to provide a laser wavelength controlling apparatus adapted for controlling the wavelength of a narrow-band oscillation laser beam with a high accuracy for a long period of time even if environmental conditions (such as the atmospheric temperature and pressure, etc.) change to some degree.

To achieve this object, according to a first aspect of the present invention, there is provided a laser wavelength controlling apparatus comprising a wavelength selective element for narrowing the band width of the laser beam to be oscillated, the apparatus including, as means for changing the wavelength to be selected by said wavelength selective element: a reference light source for generating a reference light to measure the wavelength of the oscillated laser beam with a narrow band width; detector means for leading the oscillated laser beam and the reference light into a spectroscope serving as a wavelength detector and detecting the absolute wavelength of the oscillated laser beam; and means for controlling the wavelength selected by the wavelength selective element so that the absolute wavelength detected by the detector means may correspond to a preset wavelength.

Further, according to a second aspect of the present invention, there is provided a laser wavelength controlling apparatus, characterized in that the spectroscope as set forth in the above-mentioned first aspect is one comprising a diffraction grating, and the detector means detects the oscillated laser beam by a diffracted light of N th order and detects the reference light by a diffracted light of an order of less than N th thereby controlling the wavelength of the oscillated laser beam with a narrow band width so that the exit slit images of both the diffracted lights may be located at the same position or at predetermined space intervals.

According to a third aspect of the present invention, there is provided a laser wavelength controlling apparatus, characterized in that the spectroscope as set forth in the above-mentioned first aspect is one comprising etalons, and the wavelength of the oscillated laser with a narrow band width to be selected by the wavelength selective element is controlled so that an interference band generated by the oscillated laser beam and that generated by the reference light may be located at the same position or at predetermined space intervals.

Further, according to a fourth aspect of the present invention, there is provided a laser wavelength controlling apparatus, characterized in that the reference light satisfies the relationship given by the following formula with the oscillated laser beam, whilst said detector means is adapted to detect the oscillated laser beam by a diffracted light of $(m \times n)$th order thereby detecting the reference light by a diffracted light of N th order.

$$\lambda_S - \alpha \leq m\lambda_E \leq \lambda_S + \alpha$$

wherein $\lambda_S$: wavelength of reference light; $\lambda_E$: wavelength of laser oscillation beam; $\alpha$: range of wavelengths which can be detected at the same time without having to rotate the diffraction grating of a diffraction grating type spectroscope; m: natural number of 2 or above.

According to a fifth aspect of the present invention, there is provided a laser wavelength controlling apparatus, characterized in that the reference light as set forth in the above-mentioned first aspect is a laser beam which generates a visible light, and further the light source for generating the reference light is located so as to align the optical axis of the reference laser light with that of the oscillated laser beam.

Still further, according to a sixth aspect of the present invention, there is provided a laser wavelength controlling apparatus, characterized in that the angle of the diffraction grating of the diffraction grating type spectroscope as set forth in the above-mentioned second aspect is controlled such that the exit slit image of the diffracted light of the reference light can be located at a predetermined position, and the detector means is adapted to detect the position of the exit slit image of the diffracted light of the oscillated laser beam to thereby detect the absolute wavelength of the oscillated laser beam.

The above and other advantages, aspects and objects of the present invention will become apparent to these skilled in the art by making reference to the following description, claims and the accompanying drawings in which preferred embodiments in corporating the principles of the present invention are shown by way of examples only.

DETAILED DESCRIPTION OF PREFERRED EMBODIMENTS

The present invention will now be described below by way of several embodiments with reference to FIGS. 2 to 7.

Figure 2:
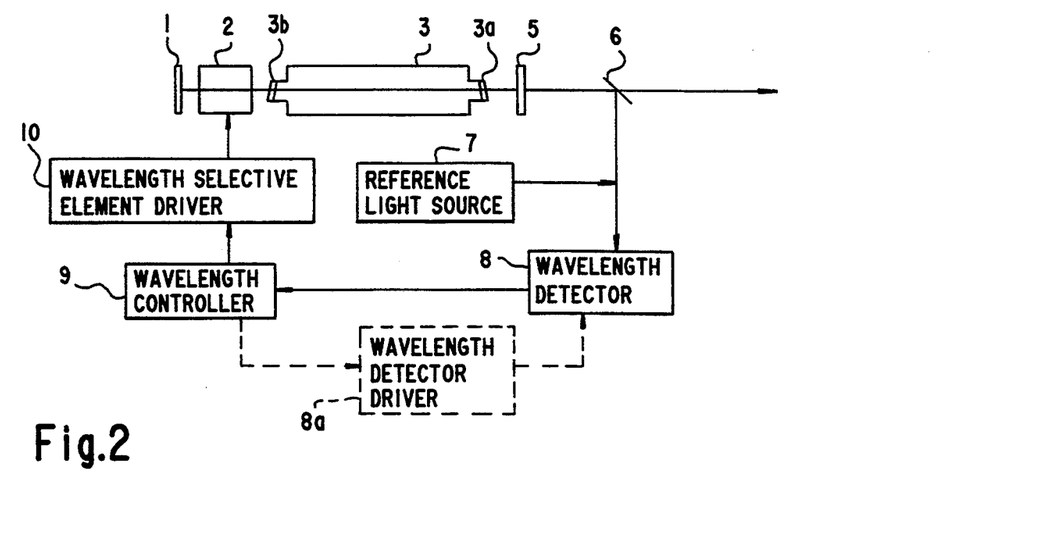
FIG. 2 is a block diagram showing the configuration of one embodiment of the laser wavelength controlling apparatus according to the present invention.

FIG. 2 shows the basic configuration of the laser wavelength controlling apparatus of the present invention.

A resonator for a narrow-band oscillation laser is configured by providing a wavelength selective element 2 and a laser chamber 3 between a rear mirror 1 and a front mirror 5. Reference numerals 3a and 3b denote windows for the laser chamber 3.

A laser beam with a narrow band width is oscillated by the front mirror 5. The laser beam is partially split by means of a beam splitter 6. The split oscillating laser beam is introduced into a wavelength detector 8. Whilst, a reference light emitted by a reference light source 7 is introduced into the wavelength detector 8.

The wavelength of the reference light and that of the oscillated laser beam with a narrow band width are detected by the wavelength detector 8, the output of which is transmitted to a wavelength controller 9. In the wavelength controller 9, the absolute value of wavelength of the oscillated laser beam with a narrow band width is computed on the basis of the wavelength of the reference light, thus computing the difference between a preset wavelength and the wavelength of the oscillated laser beam with a narrow band width. To change the wavelength of the beam selected by the wavelength selective element 2 by the detected difference in wavelength, a signal is transmitted by the wavelength controller 9 to a wavelength selective element driver 10.

The wavelength to be selected by the wavelength selective element 2 is changed by the wavelength selective element driver 10.

By repeating the above-mentioned operation, the wavelength of the oscillated laser beam with a narrow band width can be stabilized with an accuracy substantially equivalent to the stability of the reference light emitted by the reference light source.

Examples of the above-mentioned wavelength selective element 2 comprises an etalon, a diffraction grating, or a prism, or a plurality of each one of them, or a combination of them. (not shown in the accompanying drawings).

As a means for changing the wavelength to be selected by the wavelength selective element 2, the angle of incidence of the oscillated laser beam (namely, the angle between the optical axis of the oscillated laser beam and the wavelength selective element) is changed by means of a panel motor or the like, and in case the wavelength selective element 2 comprises an etalon or etalons, the air-gap width or the pressure in the air-gap is changed by means of a piezo-electric element. (not shown in the drawings).

As examples of the reference light source 7, spectral lines emitted by an atom, laser beams other than excimer lasers or higher-harmonic laser beams are used.

As examples of the wavelength detector 8, a diffraction grating type spectroscope using a monitor etalon and a diffraction grating, or the like are used.

Further, as a means for guiding the reference beam and the oscillated laser beam into the same optical path, either a Y-type optical fibre or a dichroic mirror may be used.

The term "dichroic mirror" used herein implies a mirror which allows selective transmission or reflection of beams whose wavelengths are within a predetermined range.

Further, as a means for correcting the wavelength detector 8 itself, it is possible to control a wavelength diffraction element contained in the wavelength detector 8 by means of a wavelength detector driver 8a so that the reference light having the same wavelength may be detected, whereby detecting the absolute value of the wavelength of the oscillated laser beam with a narrow band width.

Examples of the control means of the wavelength diffraction element contained in the wavelength detector 8 include one adapted to control the rotation of a diffraction grating which is used in case a diffraction grating type spectroscope is used as the wavelength detector 8, and one adapted to control the temperature, pressure and the air-gap width of an etalon or etalons which is used in case a monitor etalon spectroscope is used as the detector 8.

Figure 3:
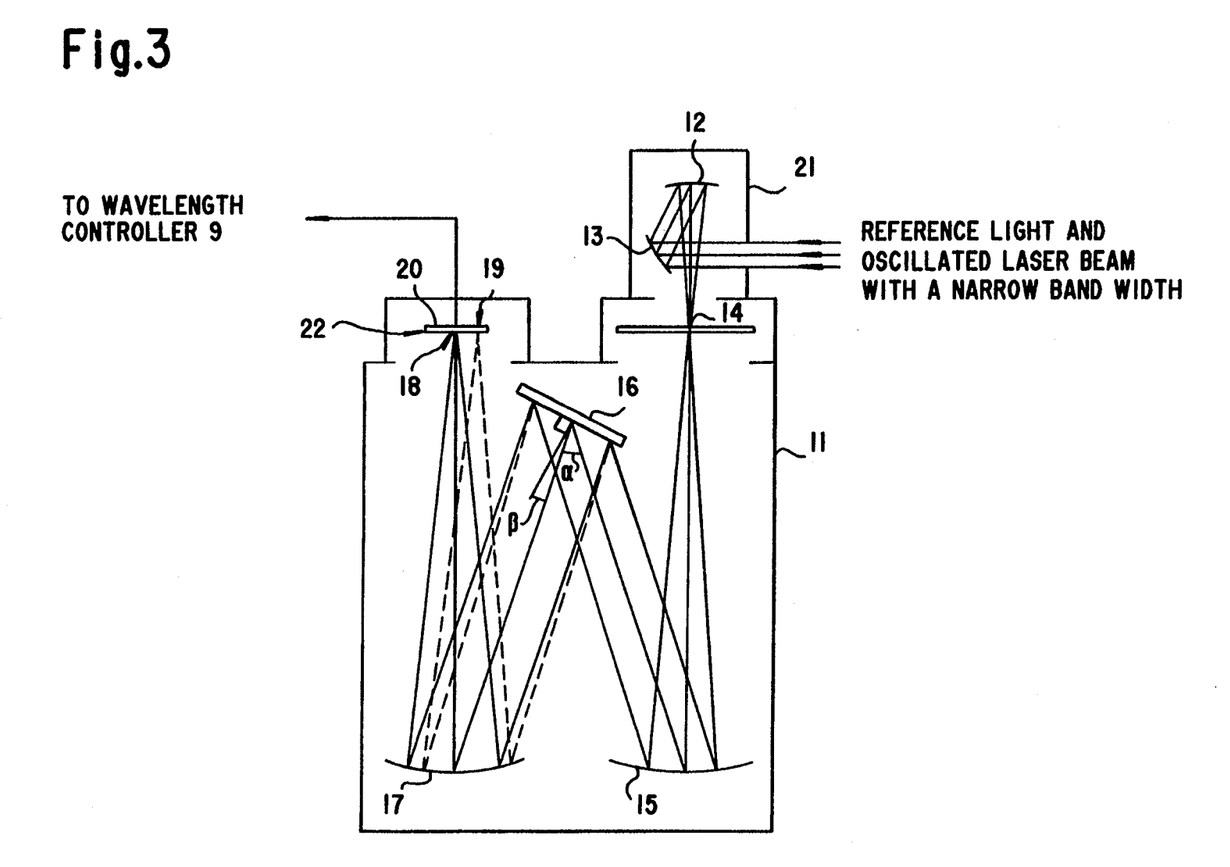
FIG. 3 is a configurational explanatory view showing one embodiment of the wavelength detector for use in the laser wavelength controlling apparatus according to the present invention.

FIG. 3 shows one embodiment wherein a diffraction grating type spectroscope is used as the wavelength detector 8.

The reference beam and the split oscillating laser beam with a narrow band width are introduced through the same optical path into an incident optical system 21 where they are reflected totally by a mirror 13 so as to be led to a concave mirror 12 by which they are focused at a position slightly before an incident slit 14 and are radiated through the incident slit 14. The beams which have transmitted through the incident slit 14 are converted by a convex mirror 15 into parallel beams, which are directed to a diffraction grating 16.

The light beam reflected and diffracted by the diffraction grating 16 varies in angle of reflection with their wavelength. The diffracted lights are reflected by a concave mirror 17 and imaged as incident slit images of the diffracted lights on a focal plane 22.

Formed on the focal plane 22 are incident slit images 18 and 19 of the diffracted lights having different wavelengths, respectively. Changes in the wavelength produce positional changes in the incident slit images 18 and 19.

Then, the position of the incident slit image 18 of the diffracted light from the reference light source, and that of the incident slit image 19 of the oscillated laser beam with a narrow band width are detected by means of a position-sensitive detector 20 which then generates an output signal to be transmitted to the wavelength controller 9.

Examples of the position-sensitive detector 20 include a photodiode array or a PSD (position-sensitive detector; that is, semi-conductor positional detector element), etc.

Whilst, when white parallel rays are directed at an angle of incidence of $\alpha$ to a principal section of a plane diffraction grating having rectilinear grooves formed at a spacing (grating constant) of d, the main peak of the intensity of a diffracted light having a wavelength of $\lambda$ occurs in the direction of angle of diffraction $\beta$ which satisfies the following equation.

$$d(\sin \alpha + \sin \beta) = m\lambda \quad (1)$$

(wherein m=0, ±1, ±2—)

The angle of incidence $\alpha$ and the angle of diffraction $\beta$ represent the angle between the incident light and a normal drawn on the surface of the diffraction grating, and that between the diffracted light and the normal, respectively.

Diffracted lights which can be observed at a position of an angle of diffraction $\beta$ when the angle of incidence $\alpha$ is kept constant include a diffracted light of first order having a wavelength of $\lambda$ (m=1) in the equation (1), a diffracted light of second order having a wavelength of $\lambda/2$ (m=2), a diffracted light of third order having a wavelength of $\lambda/3$ (m=3) —. This means that diffracted lights having different orders appear in the same direction.

Thereupon, diffracted light of m=n is referred to as "diffracted light of N th order".

Stating in brief, if diffracted lights satisfy the following formula, then their angles of diffraction $\beta$ become the same value.

$$\lambda_1 = n \cdot \lambda_2 \quad (2)$$

(wherein n is natural number)

Thus, in case a diffraction grating type spectroscope is used, if the relationship between diffracted lights satisfy the equation (2), then there occurs positional correspondence between incident slit images of diffracted lights having wavelengths $\lambda_1$ and $\lambda_2$ on the focal plane 22. Further, if the relationship $\lambda_1 \approx n \cdot \lambda_2$ is satisfied, the position of the incident slit image of the diffracted light having a wavelength of $\lambda_2$ will substantially correspond with or become close to that of the diffracted light having a wavelength of $\lambda_1$.

Thus, the wavelength of the oscillated laser beam can be controlled at a high accuracy by detecting the oscillated laser beam with a narrow band width by a diffracted light of N th order, detecting the reference light from the reference light source by a diffracted light of an order of less than N th, and controlling the wavelength selective element for oscillated laser having a narrow band width such that the incident slit images (18, 19) of both the diffracted lights may be located at the same position or at predetermined space intervals. Stating in brief, the absolute wavelength of the oscillated laser beam with a narrow band width can be detected with a high accuracy.

As an embodiment of such a combination, since the wavelength of KrF oscillated laser beam with a narrow band width is about 248.35 ±0.2 nm, emission lines of argon (Ar) ion laser having a wavelength of 496.5 nm, or emission lines of He-Se laser having a wavelength of 297.6 or 499.3 nm can be used as the reference light source.

Further, it is also possible to detect the absolute value of the wavelength of the oscillated laser beam with a narrow band width by using a reference light wherein the relationship between the wavelength $\lambda_E$ of the oscillated laser beam with a narrow band width and the wavelength $\lambda_S$ of the reference light is given by the following formula, detecting the oscillated laser beam by a diffracted light of (m×n)th order, detecting the reference light by a diffracted light of N th order, and detecting the positions of the incident slit images (18, 19) of both these diffracted lights.

$$\lambda_S \approx m\lambda_E \quad (3)$$

(wherein m is a natural number of 2 or above)

Stating in brief, the KrF oscillated laser beam with a narrow band can detect the diffracted image of a diffracted light of 2N th order, whilst the reference light (Ar. ion laser beam or He-Se laser beam) can detect the diffracted image of a diffracted light of N th order. Thus, if the oscillated laser beam with a narrow band width is detected by a light of (m×n)th order and the reference light is detected by the light of N th order, the accuracy of detecting the wavelength of the oscillated laser beam with a narrow band width will become M times higher than that of the reference light.

To the contrary, since the effect due to fluctuations in the wavelength of the reference light itself becomes 1/m of that of the oscillated laser beam with a narrow band width, it becomes possible to stabilize the wavelength of the oscillated laser beam with a narrow band width more than the stability of the wavelength of the reference light.

Therefore, as compared with the case where the wavelength of the oscillated laser beam with a narrow band width is nearly equal to that of the reference light, and diffracted lights of the same order are detected by means of a diffraction grating type spectroscope, and also with the case where the reference light is led to a monitor etalon for detection purposes, the absolute value of the wavelength of the oscillated laser beam with a narrow band width can be detected at a higher accuracy and also stabilization of the wavelength thereof can be achieved.

Further, in case higher harmonic laser beam is used as the reference light source, laser beam with a wavelength of 248.25 nm which is a second higher harmonic of argon ion laser with a wavelength of 496.5 nm, or laser beam with a wavelength of 248.8 or 249.65 nm which are second higher harmonics of He-Se laser with a wavelength of 497.6 or 499.3 nm can be used.

As an example of SHG (Second Harmonic Generator) to generate higher harmonic laser beams, $\beta$-BaB$_2$O$_4$ is available.

Figure 4:
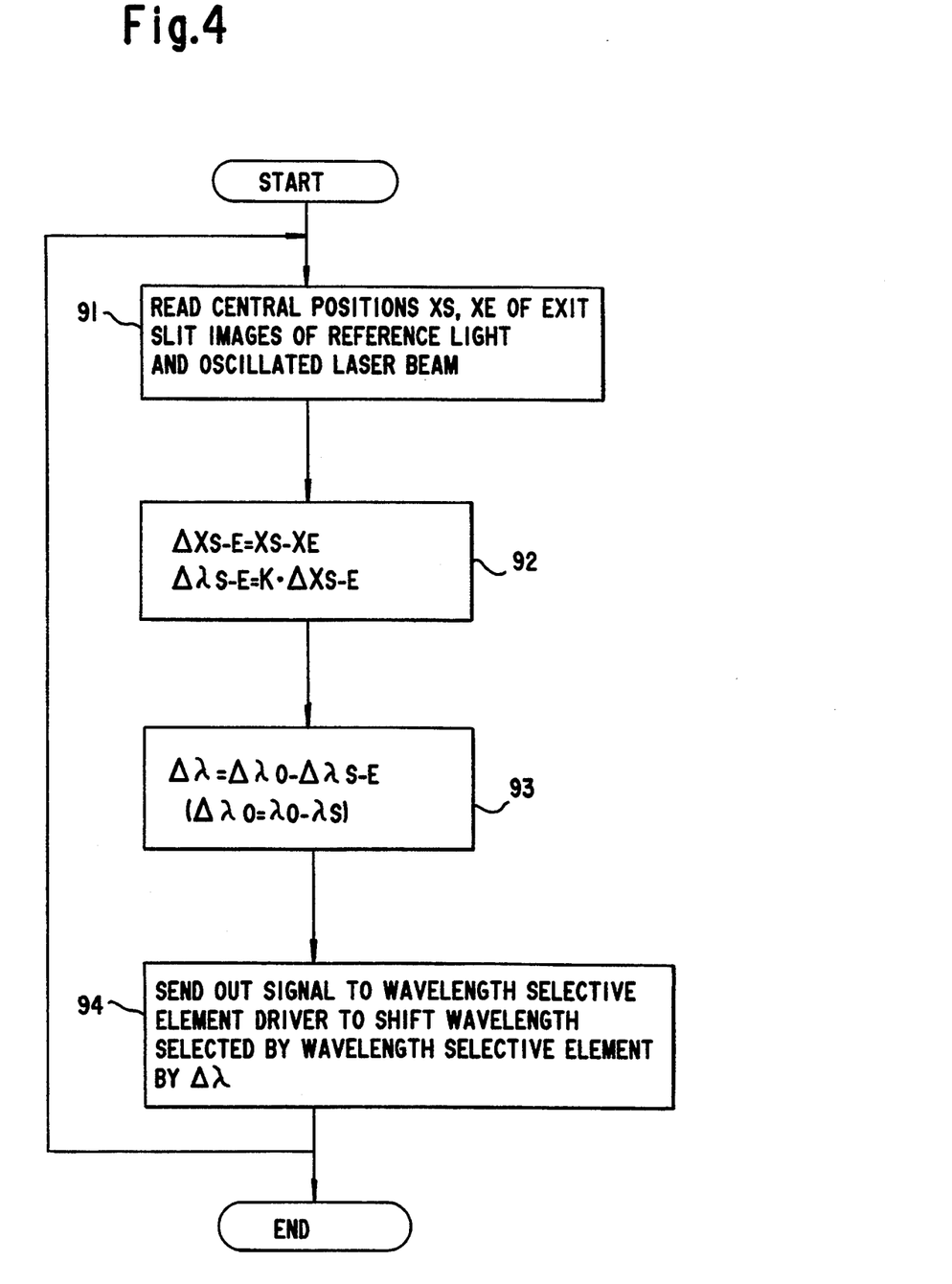
FIG. 4 is a flow chart explaining the action of a wavelength controller for use in the laser wavelength controlling apparatus of the present invention.

FIG. 4 shows a control flow chart of the wavelength controller 9 wherein a diffraction grating type spectroscope is used as the wavelength detector 8 and a position-sensitive detector is used as the sensor.

In the first place, the central position $X_S$ of the exit slit image 18 of the diffracted light from the reference light source and the position $X_E$ of the exit slit image 19 of the oscillated laser beam are read. (STEP 91) Next, the positional difference in both slit images $\Delta X_{S-E}$ is computed, and then $\Delta \lambda_{S-E}$ is computed on the basis of the differential value. (STEP 92) The difference between a preset wavelength $\lambda_o$ and the wavelength $\lambda_S$ of the reference light from the reference light source is set at $\Delta \lambda_o$. Then, the difference $\Delta \lambda$ between $\Delta \lambda_o$ and $\Delta \lambda_{S-E}$ ($=\lambda_{S-E}-\Delta\lambda_o$) is computed. (STEP 93) The value of $\Delta \lambda$ is an error between the wavelength $\lambda_{S-E}$ of the oscillated laser beam with a narrow band width and a preset wavelength $\lambda_o$. The system is arranged to transmit a signal to the wavelength selective element driver so as to correct the wavelength selected by the wavelength selective element by this error $\Delta \lambda$. (STEP 94) As a result, there is obtained a laser beam with a narrow band width whose wavelength is equivalent to the preset wavelength $\lambda_o$.

In this embodiment, fluctuations in wavelength due to changes in environmental conditions (such as, for example, the atmospheric temperature, pressure etc.) which occur in the spectroscope are corrected by detecting the positional difference between the incident slit images of both the diffracted lights. However, the wavelength of the oscillated laser beam with a narrow band width may be detected by controlling always the angle of diffraction grating so that the incident slit image of the diffracted light of the reference light may always be located at the same position on the focal plane to thereby correct fluctuations which occur in the focal plane.

Figure 5:
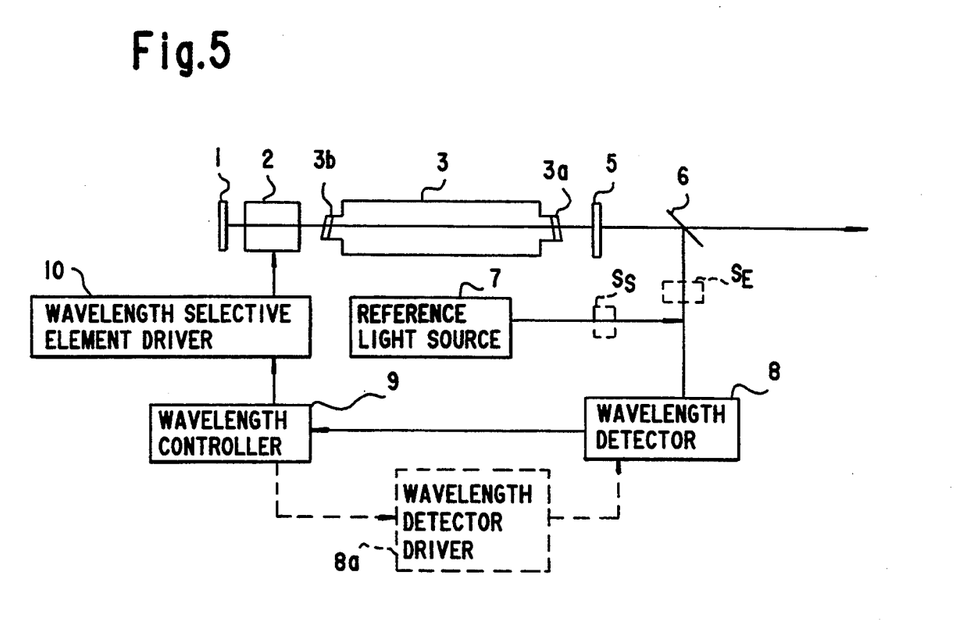
FIG. 5 is a block diagram showing the configuration of another embodiment of the laser wavelength controlling apparatus according to the present invention.

In FIG. 5, there is shown an embodiment of the means for detecting the position of the diffracted image of the reference light and that of the diffracted image of the oscillated laser beam with a narrow band width by using a position-sensitive detector.

For example, in case PSD is installed as the position-sensitive detector, a shutter $S_S$ is provided at the inlet of an optical fibre for sampling the reference light, and a shutter $S_E$ is provided at the inlet of an optical fibre for sampling the oscillated laser beam with a narrow band width. The arrangement is made such that when sampling the reference light the shutter $S_S$ is opened and the shutter $S_E$ is closed, whilst when sampling the oscillated laser beam with a narrow band width the reverse operation is made.

Further, in case continuously oscillating laser beam such as argon ion laser is used as the reference light, since the oscillated laser with a narrow band width is a pulse-generated beam, the positions of both the diffracted images can be detected at the same time by detecting the oscillated laser beams by means of a high pass filter and detecting Ar, ion laser beam by means of a low pass filter without having to use the shutters. Further, in case there is a bad influence on the positional detecting accuracy of the diffracted image of the oscillated laser with a narrow band width due to continual incidence of the argon ion laser beam, a shutter is provided at the inlet of an optical fibre for sampling the reference light, and when sampling the diffracted image of the oscillated laser beam with a narrow band width, the detection of the diffracted image may be made by closing the shutter.

Thus, by detecting both the diffracted images of the reference light and of the oscillated laser beam with a narrow band width by means of one piece of PSD, the positions of both the diffracted images can be detected with a high accuracy.

Further, in case a photodiode array sensor such as CCD or the like is used as the position-sensitive detector, there is no need for provision of shutters, and it is only necessary to detect the positions of both the diffracted images of the reference light and of the oscillated laser beam by keeping the exposure time constant or by keeping the number of sampling of the oscillated laser beam with a narrow band width.

Figure 6:
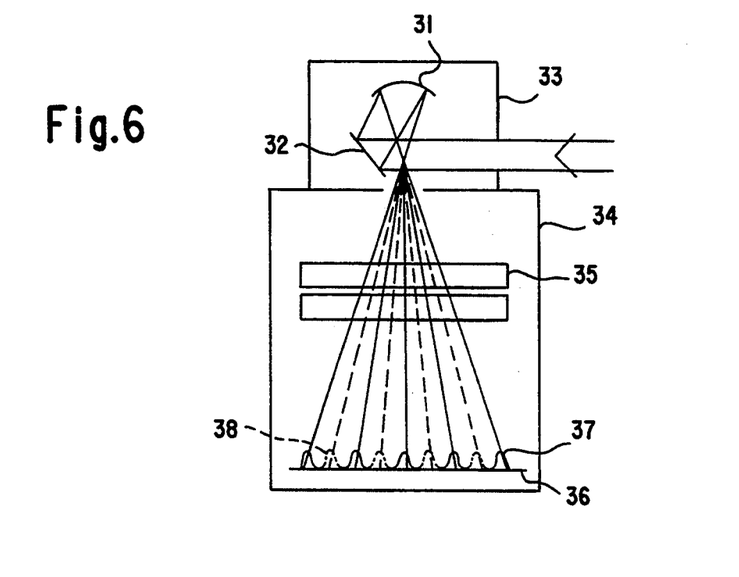
FIG. 6 is a configurational explanatory view showing another embodiment of the wavelength detector for use in the laser wavelength controlling apparatus of the present invention.

FIG. 6 shows an embodiment wherein a monitor-etalon spectroscope is used as the wavelength detector 8.

In general, the wavelength of the light transmitting through an etalon can be expressed by the following equation.

$$m\lambda = 2nd \cos \theta \qquad (4)$$

Wherein, m: integer, d: distance between partial reflector mirrors of etalon, n: refractivity between the partial reflector mirrors, $\theta$: angle between the normal of the etalon and the optical axis of incident hole.

In the equation (4), if the values of n, d and m are kept constant, then changes in the wavelength $\lambda$ produce changes in the angle $\theta$. Therefore, this character can be used for wavelength detecting purposes.

In the first place, the reference light and the oscillated laser beam with a narrow band width are led along the same optical path into an incident optical system 33 wherein they are subjected to total reflection by a mirror 32 so as to be led to a concave mirror 31 by which they are focused and then led to etalons 35 at an angle of divergence. Only the lights which satisfy the equation (4) are allowed to transmit through the etalons 35 so as to form an interference band 37. Therefore, changes in the wavelength of the lights incident on the etalons 35 produce changes in the position of the interference band 37.

Therefore, the position of an interference band 38 formed by the reference light and that of the interference band 37 formed by the oscillated laser with a narrow band width are detected by a position-sensitive detector 36, which then generates an output signal to be transmitted to a wavelength controller 9.

Thus, it becomes possible to control the wavelength of the oscillated laser with a narrow band width at a high accuracy by controlling the wavelength selective element 2 such that both the interference bands 37 and 38 may be located at the same position or at predetermined space intervals.

In this embodiment, in case the wavelength of the oscillated laser beam is much different from that of the reference light, then the partial reflector mirrors of the etalons 35 may be coated with a reflective film which is capable of partially reflecting both the reference light and the laser beam.

A control flow chart for a wavelength controller wherein monitor etalons are used as the wavelength detector and a position-sensitive detector is used as the sensor is the same as the flow chart shown in FIG. 4.

Further, whilst in this embodiment fluctuations due to the monitor-etalon spectroscope are corrected by detecting the positional difference between both interference bands, the wavelength of the oscillated laser with a narrow band width may be detected by effecting a feed-back control of the temperature and pressure of the monitor etalons and the spacing between the reflector mirrors so that the interference band formed by the reference light may always be aligned coaxially with that formed by the laser beam to thereby correct the fluctuations due to the monitor etalon spectroscope.

Figure 7:
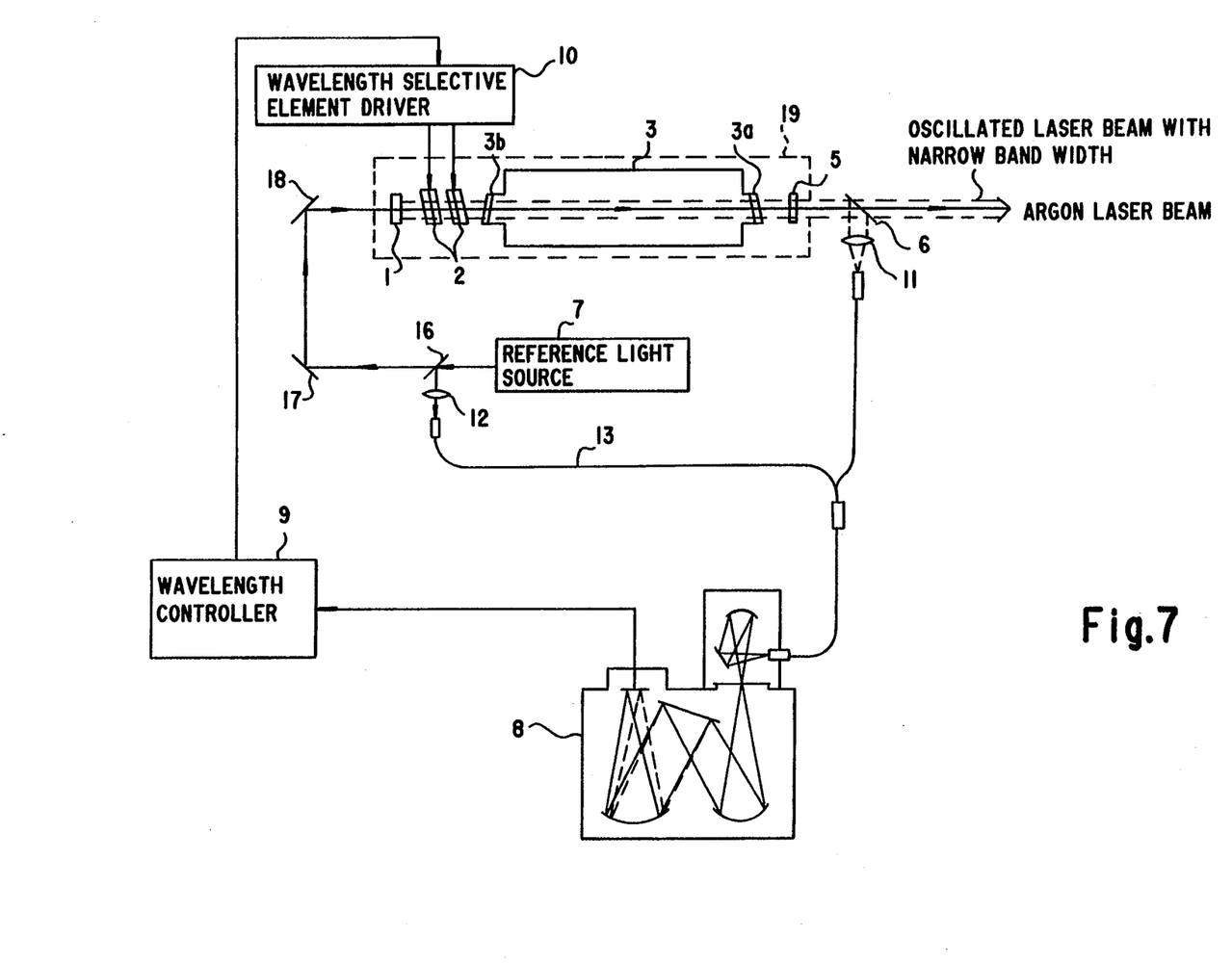
FIG. 7 is a block diagram showing the configuration of a further embodiment of the laser wavelength controlling apparatus.

FIG. 7 shows an embodiment wherein the laser beam for generating a visible light is used as the reference light, and the optical axis of the oscillated laser beam is aligned with that of the reference light.

A KrF narrow-band laser oscillating device 19 comprises a resonator formed by a front mirror 5 and a rear mirror 1, and etalons 2a, 2b serving as wavelength selective elements located between the rear mirror 1 and a laser chamber 3. The rear mirror 1, the front mirror 5, the etalons 2a, 2b and a beam splitter 6 have a reflective film or a dielectric film coated thereon and which can reflect only the oscillated laser beam with a narrow band width and through which the visible light can pass, and therefore the arrangement is made to enable the visible light from the rear mirror 1 to transmit through the beam splitter 6.

In this embodiment, an argon ion laser generator 7 is used as the reference light source. The argon ion laser generator 7 may be either of a multi-oscillator type capable of emitting laser of 496.5 nm, or of a single oscillator type capable of emitting only 496.5 nm. This argon ion laser beam is split by a beam splitter 16 and then directed via a lens 12 into a Y-type optical fibre 13. In case the argon ion laser generator 7 is of a multi-oscillator type, the beam splitter 16 may have a reflective film coated thereon and which reflects totally only emission lines of 496.5 nm and allows transmission of other emission lines.

The argon ion laser beam which has passed through the beam splitter 16 is aligned by the mirrors 18 and 17 with the optical axis of the KrF oscillated laser beam.

Since this argon ion laser beam passes through the rear mirror 1, the etalons 2a, 2b, a window 3a, the front mirror 5 and the beam splitter 6 and is aligned with the optical axis of the oscillated laser beam with a narrow band width, it becomes possible to observe easily the optical path of the oscillating laser beam with a narrow band width so that adjustments of the mirrors may be made for the degree of parallel thereof.

Further, the oscillated laser beam with a narrow band width is sampled by the beam splitter 6 and input through a lens 11 into a Y-type optical fibre 13. And then, the argon ion laser beam and the oscillated laser beam with a narrow band width are input by the Y-type optical fibre 13 into a diffraction grating type spectroscope 8. Then, the absolute value of the oscillated laser beam with a narrow band width is detected, the difference between the absolute value and the preset wavelength is computed, and a signal is transmitted to the wavelength selective element driver 10 to shift the wavelength selected by the etalons by an amount corresponding to the difference in wavelength. Thus, an oscillating laser beam with a narrow band whose wavelength is equivalent to the preset value can be obtained.

As mentioned hereinabove, this embodiment is constructed such that the use of visible light as the reference light from the reference light source enables the reference light itself to serve concurrently as the light for aligning the oscillating laser beam.

What is claimed is:

1. A laser wavelength controlling apparatus, comprising:

wavelength selective means for narrowing a spectral bandwidth of an oscillated laser beam; and means for changing a wavelength selected by said wavelength selective means, wherein said changing means includes:

a reference light source for generating a reference light for use in measuring a wavelength of the oscillated laser beam, detector means for admitting said oscillated laser beam and said reference light to a spectroscope serving as a wavelength detector and for detecting an absolute wavelength of said oscillated laser beam on the basis of a detected value of said reference light, and means for controlling a wavelength selected by said wavelength selective means so that the absolute wavelength detected by the detector means coincides with a preset wavelength.

2. A laser wavelength controlling apparatus as claimed in claim 1, wherein said spectroscope comprises:

a diffraction grating, wherein said detector means detects said oscillated laser beam by a diffracted light of N th order and detects said reference light by a diffracted light of an order of less than N th, and wherein the wavelength selected by the wavelength selective means is so controlled that exit slit images of both the diffracted lights are located at the same position or at predetermined space intervals.

3. A laser wavelength controlling apparatus as claimed in claim 2, wherein an angle of the diffraction grating of the diffraction grating type spectroscope is controlled such that the exit slit image of the diffracted light of said reference light is located at a predetermined position, and said detector means detects the position of the exit slit image of the diffracted light of said oscillated laser beam to thereby detect the absolute wavelength of the oscillated laser beam.

4. A laser wavelength controlling system as claimed in claim 1, wherein said spectroscope comprises etalons, and wherein the wavelength selected by the wavelength selective means is so controlled that an interference band generated by said oscillated laser beam and that generated by said reference light are located at the same position or at predetermined space intervals.

5. A laser wavelength controlling apparatus as claimed in claim 1, wherein said reference laser beam satisfies the relationship given by the following formula with said oscillated laser beam, while said detector means detects the oscillated laser beam by a diffracted light of (m×n)th order thereby detecting the reference light by a diffracted light of N th order:

$$\lambda_S - \alpha \leq m\lambda_E \leq \lambda_S + \alpha$$

wherein $\lambda_S$: wavelength of reference light; $\lambda_E$: wavelength of oscillated laser beam, $\alpha$: range of wavelengths detectable at the same time without rotating the diffraction grating of a diffraction grating type spectroscope; m: natural number of 2 or above.

6. A laser wavelength controlling apparatus as claimed in claim 1, wherein said reference light is a laser beam which generates a visible light, and further said light source for generating the reference light is located so as to align an optical axis of the reference light with that of the oscillated laser beam.

7. A laser wavelength controlling apparatus as claimed in claim 1, wherein said detector means includes a position-sensitive detector.

8. A laser wavelength controlling apparatus, as claimed in claim 1, wherein said reference light is one selected from among a group including spectral lines emitted by atoms, laser beams other than excimer lasers and higher harmonic beams.

* * * * *

UNITED STATES PATENT AND TRADEMARK OFFICE
CERTIFICATE OF CORRECTION

PATENT NO.   : 5,373,515
DATED        : December 13, 1994
INVENTOR(S)  : WAKABAYASHI et al.

It is certified that error appears in the above-identified patent and that said Letters Patent is hereby corrected as shown below:

On the cover page, Item [75], line 2, "Yoshino Amada" should read --Yoshiho Amada--.

Signed and Sealed this

Eighteenth Day of April, 1995

Attest:

BRUCE LEHMAN

Attesting Officer

Commissioner of Patents and Trademarks